United States Patent
Li et al.

(10) Patent No.: US 10,705,905 B2
(45) Date of Patent: Jul. 7, 2020

(54) SOFTWARE-ASSISTED FINE-GRAINED DATA PROTECTION FOR NON-VOLATILE MEMORY STORAGE DEVICES

(71) Applicant: EMC IP HOLDING COMPANY LLC, Hopkinton, MA (US)

(72) Inventors: Ningdong Li, Acton, MA (US); Stephen Ives, West Boylston, MA (US); Seema Pai, Shrewsbury, MA (US); Scott Rowlands, Marietta, GA (US); James Guyer, Northboro, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/174,392

(22) Filed: Oct. 30, 2018

(65) Prior Publication Data

US 2020/0133764 A1    Apr. 30, 2020

(51) Int. Cl.
  *G06F 11/00*  (2006.01)
  *G06F 11/10*  (2006.01)
  *G06F 3/06*   (2006.01)

(52) U.S. Cl.
  CPC .......... *G06F 11/1004* (2013.01); *G06F 3/061* (2013.01); *G06F 3/067* (2013.01); *G06F 3/0619* (2013.01); *G06F 3/0659* (2013.01)

(58) Field of Classification Search
  None
  See application file for complete search history.

(56) References Cited

U.S. PATENT DOCUMENTS

| | | | | |
|---|---|---|---|---|
| 2014/0325143 | A1* | 10/2014 | Kelton | G06F 3/0659 711/114 |
| 2015/0135042 | A1* | 5/2015 | Im | G06F 11/1004 714/807 |
| 2016/0147651 | A1* | 5/2016 | Desai | G06F 12/0246 711/103 |
| 2019/0004888 | A1* | 1/2019 | Chagam Reddy | G06F 11/0727 |

* cited by examiner

*Primary Examiner* — Mujtaba M Chaudry
(74) *Attorney, Agent, or Firm* — Anderson Gorecki LLP

(57) ABSTRACT

Selective use of a software path and hardware path help to provide fine-grained T10-PI support while maintaining IO operation efficiency for single IO read/write commands transferring multiple data segments. NVMe hardware capability (i.e. the hardware path) is always utilized for CPU-intensive CRC verification. NVMe hardware capability is utilized for application tag and reference tag verification whenever possible. Software running on a computing node (i.e. the software path) is used for application tag and reference tag verification and replacement when those functions cannot be implemented by the NVMe hardware.

20 Claims, 3 Drawing Sheets

SOFTWARE-ASSISTED FINE-GRAINED DATA PROTECTION FOR NON-VOLATILE MEMORY STORAGE DEVICES

TECHNICAL FIELD

The subject matter of this disclosure is generally related to computer networks in which storage arrays maintain data for host applications that run on servers, and more particularly to data protection for single IO read/write commands transferring multiple data segments.

BACKGROUND

A storage array manages access to host application data stored on non-volatile drives such as SSDs (solid state drives) and HDDs (hard disk drives). The host application data may be accessed by multiple host servers, each of which may support multiple instances of the host application. The managed drives are not discoverable by the host servers, but the storage array creates a logical production volume that is discoverable and accessible by the host servers. The production volume has contiguous fixed-size LBAs (logical block addresses) that map to non-contiguous physical addresses of the managed drives. The host servers send IO (input-output) commands, e.g. SCSI (small computer system interface) commands, to the storage array with reference to the storage space of the production volume. The storage array uses metadata to access the corresponding storage space on the managed drives to service the IO commands.

SUMMARY

All examples, aspects and features mentioned in this document can be combined in any technically possible way.

In accordance with an aspect a method comprises: in a storage array comprising a plurality of interconnected computing nodes, each of the computing nodes comprising at least one processor and a non-transitory memory, and a drive array comprising a plurality of non-volatile data storage drives on which extents of data are stored, each data storage drive connected to at least one of the computing nodes: with the computing node: selecting a first IO (input-output) command; determining that the first IO command is associated with only a single data segment in the memory; determining that the first IO command does not require replacement of an application tag; and determining that the first IO command does not require replacement of a reference tag; and with the drive array: performing CRC (cyclic redundancy check) verification of data associated with the first IO command; performing application tag verification of data associated with the first IO command; and performing reference tag verification of data associated with the first IO command. Some implementations comprise the computing node selecting a second IO command, determining that the second IO command is associated with multiple data segments, and in response performing application tag verification and reference tag verification of data associated with the second IO command with software running on the computing node. Some implementations comprise performing CRC (cyclic redundancy check) verification of data associated with the second IO command with the drive array. Some implementations comprise the computing node selecting a second IO command, determining that the second IO command requires replacement of an application tag, and in response replacing the application tag and performing application tag verification. Some implementations comprise performing CRC (cyclic redundancy check) verification of data associated with the second IO command with the drive array. Some implementations comprise the computing node selecting a second IO command, determining that the second IO command requires replacement of a reference tag, and in response replacing the reference tag and performing reference tag verification. Some implementations comprise performing CRC (cyclic redundancy check) verification of data associated with the second IO command with the drive array.

In accordance with an aspect an apparatus comprises: a plurality of interconnected computing nodes, each of the computing nodes comprising at least one processor and a non-transitory memory; a drive array comprising a plurality of non-volatile data storage drives on which extents of data are stored, each data storage drive connected to at least one of the computing nodes; and software implemented by the computing node, comprising: instructions that select a first IO (input-output) command; instructions that determine that the first IO command is associated with only a single data segment in the memory; instructions that determine that the first IO command does not require replacement of an application tag; and instructions that determine that the first IO command does not require replacement of a reference tag; wherein the drive array performs CRC (cyclic redundancy check) verification of data associated with the first IO command, performs application tag verification of data associated with the first IO command, and performs reference tag verification of data associated with the first IO command. In some implementations the software implemented by the computing node selects a second IO command, determines that the second IO command is associated with multiple data segments, and in response performs application tag verification and reference tag verification of data associated with the second IO command. In some implementations the drive array performs CRC (cyclic redundancy check) verification of data associated with the second IO command. In some implementations the software implemented by the computing node selects a second IO command, determines that the second IO command requires replacement of an application tag, and in response replaces the application tag and performing application tag verification. In some implementations the drive array performs CRC (cyclic redundancy check) verification of data associated with the second IO command. In some implementations the software implemented by the computing node selects a second IO command, determines that the second IO command requires replacement of a reference tag, and in response replaces the reference tag and performing reference tag verification. In some implementations the drive array performs CRC (cyclic redundancy check) verification of data associated with the second IO command.

In accordance with an aspect an apparatus comprises: a storage system comprising a computing node connected with a drive array, and software that determines that a first IO (input-output) command is associated with only a single data segment in memory, determines that the first IO command does not require replacement of an application tag, determines that the first IO command does not require replacement of a reference tag, and prompts drive array hardware to perform CRC (cyclic redundancy check) verification of data associated with the first IO command and verify at least one of an application tag and a reference tag associated with the first IO command. In some implementations the software determines that a second IO command is associated with multiple data segments, and in response performs application tag verification and reference tag verification of data associated with the second IO command. In some implementations the drive array hardware performs CRC (cyclic redundancy check) verification of data associated with the second IO command. In some implementations the software determines that the second IO command requires replacement of at least one of the application tag and reference tag and, in response, replaces at least one of the application tag and the reference tag. In some implementations the software performs at least one of application tag verification and reference tag verification on the second IO command. In some implementations the drive array hardware performs CRC (cyclic redundancy check) verification of data associated with the second IO command.

Other aspects, features, and implementations may become apparent in view of the detailed description and figures.

DETAILED DESCRIPTION

Aspects of the inventive concepts will be described as being implemented in a data storage system that includes a host server and storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "storage array" and "solid state drive" are intended to include all storage nodes and storage components in which the inventive concepts may be implemented. The terms "logical" and "virtual" are used to refer to features that are abstractions of other features, e.g. and without limitation abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory computer-readable medium and implemented by multi-purpose tangible processors, and any combinations thereof.

Figure 1:
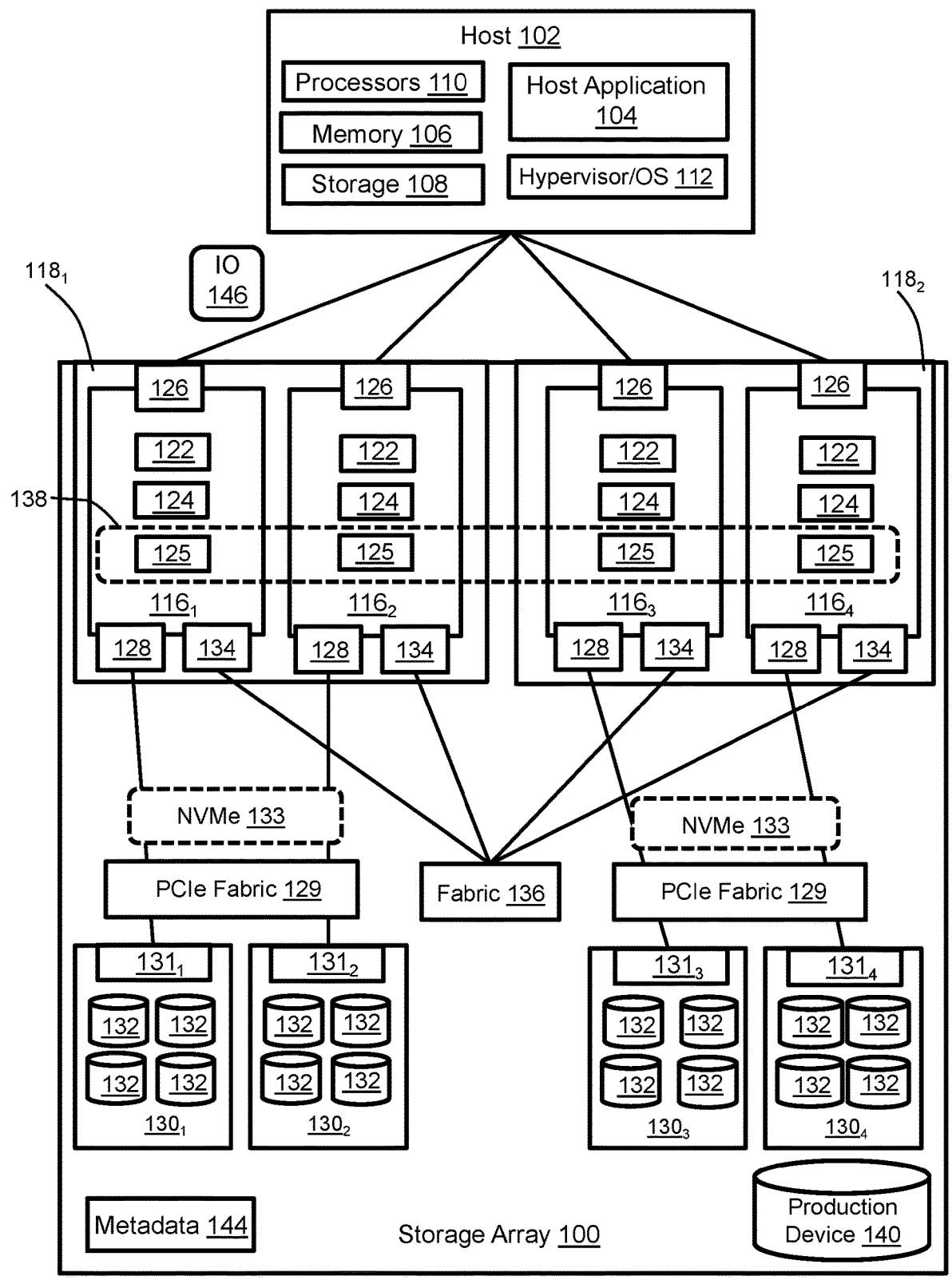
FIG. 1 illustrates a storage array that implements software-assisted fine-grained data protection for IOs that have multiple SGLs or require application tag or reference tag replacement.

FIG. 1 illustrates a storage array that implements software-assisted fine-grained data protection. In the illustrated example the network includes a storage array 100 that is connected to a host 102. There would typically be multiple hosts and storage arrays in the network, but the illustrated example is simplified to facilitate understanding of salient aspects.

The host 102 may be a type of server computer that includes volatile memory 106, non-volatile storage 108, one or more tangible processors 110, and a hypervisor or OS (operating system) 112. The volatile memory 106 may include RAM (random access memory) of any type. The non-volatile storage 108 may include drives of one or more technology types, for example, and without limitation, SSDs such as flash, and HDDs such as SATA (Serial Advanced Technology Attachment) and FC (Fibre Channel). Although an external host server is illustrated, internal hosts may be instantiated within the storage array.

The storage array 100 includes a plurality of interconnected computing nodes $116_1$-$116_4$ that maintain data on, and control access to, managed drives 132. Each computing node includes at least one multi-core processor 122 (having multiple CPUs (central processing units)) and local volatile memory 125. The local volatile memory 125 may include, for example and without limitation, components such as RAM of any type. Each computing node may also include one or more FAs 126 (front-end adapters) for communicating with the host 102. Each computing node $116_1$-$116_4$ may also include one or more BAs 128 (back-end adapters) for communicating with respective associated drive arrays $130_1$-$130_4$, thereby enabling access to the managed drives 132. The managed drives 132 may include tangible persistent data storage components of one or more technology types, for example, and without limitation, SSDs such as flash drives and SCM (storage class memory), and HDDs such as SATA and FC, but for purposes of explanation the managed drives will be described below as flash drives. Each computing node may also include one or more CAs (channel adapters) 134 for communicating with other computing nodes via an interconnecting fabric 136. Each computing node may allocate a portion or partition of its respective local volatile memory 125 to a virtual shared memory 138 that can be accessed by other computing nodes, e.g. via DMA (direct memory access) or RDMA (remote direct memory access). Pairs of the computing nodes, e.g. ($116_1$, $116_2$) and ($116_3$, $116_4$), may be organized as storage engines $118_1$, $118_2$, respectively, for purposes of failover between computing nodes. The paired computing nodes of each storage engine may be directly interconnected by communication links.

One function of the storage array 100 is to maintain data for instances of a host application 104 running on the host 102. Specifically, host application data is maintained on the managed drives 132. Examples of host applications may include but are not limited to file servers, email servers, block servers, and databases. The managed drives 132 are not discoverable by the host 102 but the storage array 100 maintains a logical production device 140 that can be discovered and accessed by the host 102. Without limitation, the production device 140 may be referred to as a production volume or production LUN, where LUN (Logical Unit Number) is a number used to identify the logical storage volume in accordance with the SCSI (Small Computer System Interface) protocol. From the perspective of the host 102, the production device 140 is a single data storage device having a set of contiguous fixed-size LBAs (logical block addresses) on which data used by instances of the host application resides. However, the host application data is stored at non-contiguous addresses on various different managed drives 132 that are abstracted by the production volume.

In order to service IOs from instances of the host application 104, the storage array 100 maintains metadata 144 in the shared memory that indicates, among various things, mappings between LBAs of the production device 140 and addresses with which extents of host application data can be accessed from the shared memory 138 and managed drives 132. In response to a data access instruction from an instance of the host application 104, the hypervisor/OS 112 initially determines whether the instruction can be serviced by accessing the host server memory 106. If that is not possible then an IO 146 is sent from the host 102 to the storage array 100. There are multiple paths between the host 102 and the storage array 100, e.g. one path per FA 126. The paths may be selected based on a wide variety of techniques and algorithms including, for context and without limitation, performance and load balancing. In the case of an IO to read data from the production device the storage array uses the metadata 144 to find the requested data in the shared memory 138 or managed drives 132. More particularly, if the requested data is not in the shared memory 138 then the requested data is temporarily copied into the shared memory from the managed drives 132 and used to service the IO, i.e. reply to the host application with the data via one of the computing nodes. In the case of an IO to write data to the production device the storage array copies the data into shared memory, marks the corresponding production device location as dirty in the metadata, and creates new metadata that maps the production device address with a location to which the data is eventually written on the managed drives.

The BAs 128 are connected to the managed drives 132 via a PCIe (peripheral component interconnect express) fabric 129 and storage controllers (or switches) $131_1$-$131_4$ using an NVMe (non-volatile memory host controller interface) 133. The NVMe protocol is described in a specification that is publicly available at www.nvmexpress.org. In order to access the managed drives to service IOs from the host 102, the computing nodes generate NVMe commands (e.g. Read and Write IOs) that are placed in a submission queue in the shared memory 138. After inserting an NVMe command into a submission queue, the computing node writes to a doorbell register to prompt the storage controller to read the submission queue. The storage controller may copy data being written from the shared memory to the managed drives, or copy data being read from the managed drives to the shared memory. A completion message placed in a completion queue in the shared memory notifies the computing node when the NVMe command has been implemented by the storage controller.

T10-PI (protection information) allows a checksum to be transmitted between the host and the managed drives to validate data associated with an IO, thereby providing a per-IO end-to-end integrity check. T10-PI provides such data integrity checks using CRC, application tags, and reference tags. T10-PI manipulation such as application tag and reference tag replacement can be implemented during data transfer for a variety of reasons.

The NVMe protocol defines commands that utilize PRP (physical region pages) or SGL (scatter gather lists) to denote a data buffer location in which the data being read or written is located in the shared memory. The data buffer may be represented using a single SGL entry or multiple SGL entries. Multiple SGL entries may designate multiple segments of data at non-contiguous locations. With a managed drive that utilizes SAS (serial attached SCSI) technology, multiple data segments with distinct application tag or reference tag verification and/or application tag or reference tag replacement requirements can be transferred between the data buffer and a managed drive using a single IO command with multiple SGLs, i.e. one SGL per data segment. However, although NVMe hardware supports multiple SGLs per IO command, it only provides T10-PI verification capability on a per IO basis. In other words, per data segment T10-PI verification with distinct application tags or reference tags is unsupported. Furthermore, NVMe hardware does not support replacing application tags or reference tags during data transfer.

Figure 2:
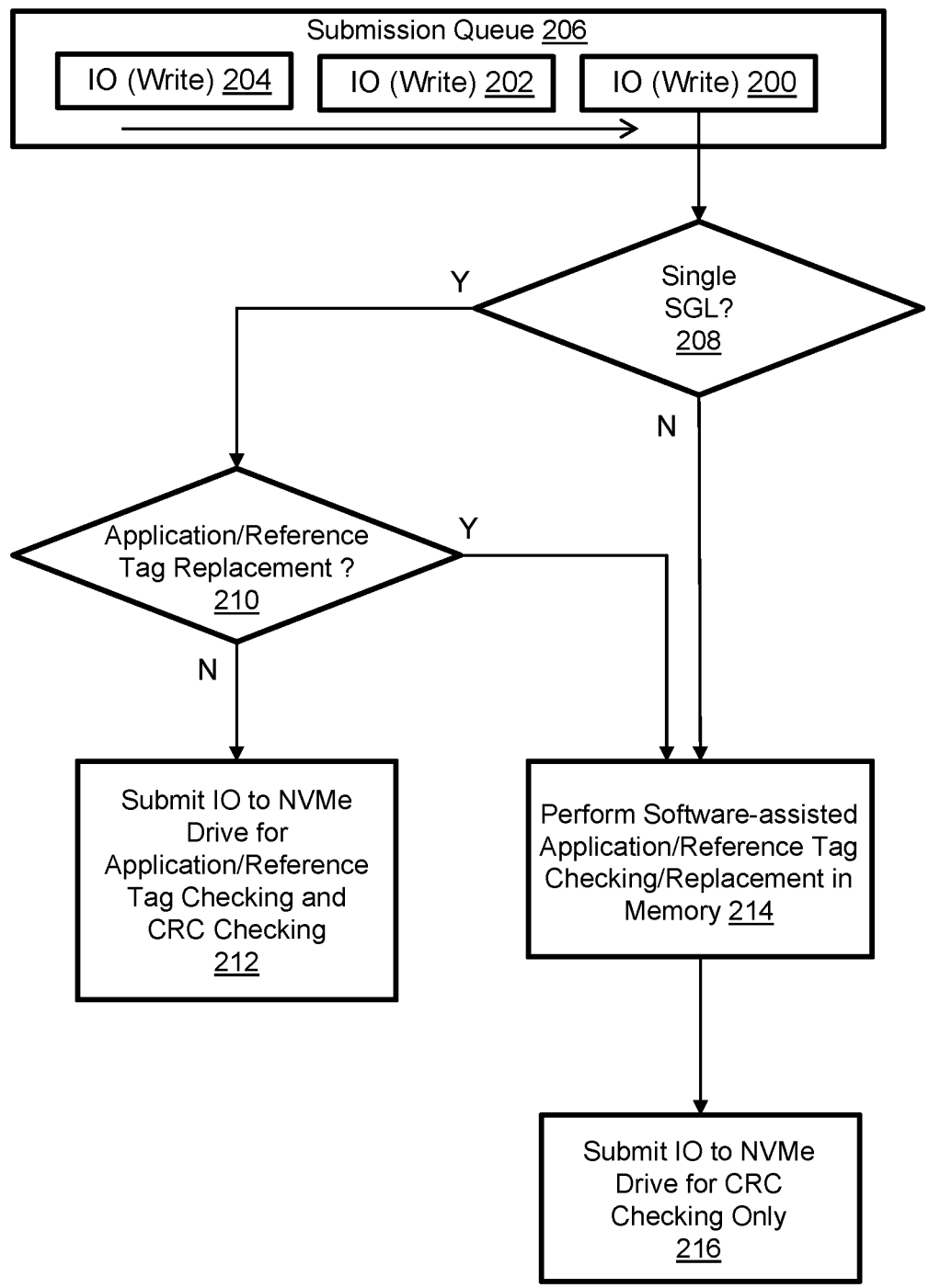
FIG. 2 is a flow diagram that illustrates software-assisted fine-grained data protection for write commands.

FIG. 2 is a flow diagram that illustrates software-assisted fine-grained data protection for write commands. Write IOs 200, 202, 204 in a submission queue 206 are each processed separately to determine on a per-IO basis whether to use a software-assist path. A selected IO 200 is examined to determine whether only a single SGL is specified as indicated at step 208. If only a single SGL is specified, then the IO 200 is examined to determine whether application tag or reference tag replacement is required as indicated at step 210. If not, then the IO is submitted to the NVMe managed drive for application tag and reference tag validation and CRC verification as indicated in step 212. In other words, for single SGL write IOs that do not require T10-PI application tag or reference tag replacement, the application tag validation, reference tag validation, and CRC verification are performed by the NVMe managed drive during the data transfer. Write IOs that include multiple SGLs and/or require application tag or reference tag replacement are sent to the software-assist path. For example, if multiple SGLs are associated with the IO 200 as determined in step 208 then software-assisted application tag and reference tag replacement and verification are performed in the shared memory by the computing node processor as indicated in step 214. If only a single SGL is found in step 208 but application tag or reference tag replacement is determined to be required in step 210 then software-assisted application tag and reference tag replacement and checking are performed in the shared memory by the computing node processor as indicated in step 214. In both situations the IO is then submitted to the NVMe managed drive for CRC-only checking as indicated in step 216. More particularly, in the software assist path only the CRC verification is enabled for the NVMe managed drive, while the application tag and reference tag verification and replacement are done by software implemented by the computing node prior to starting to send data to the managed drive.

Figure 3:
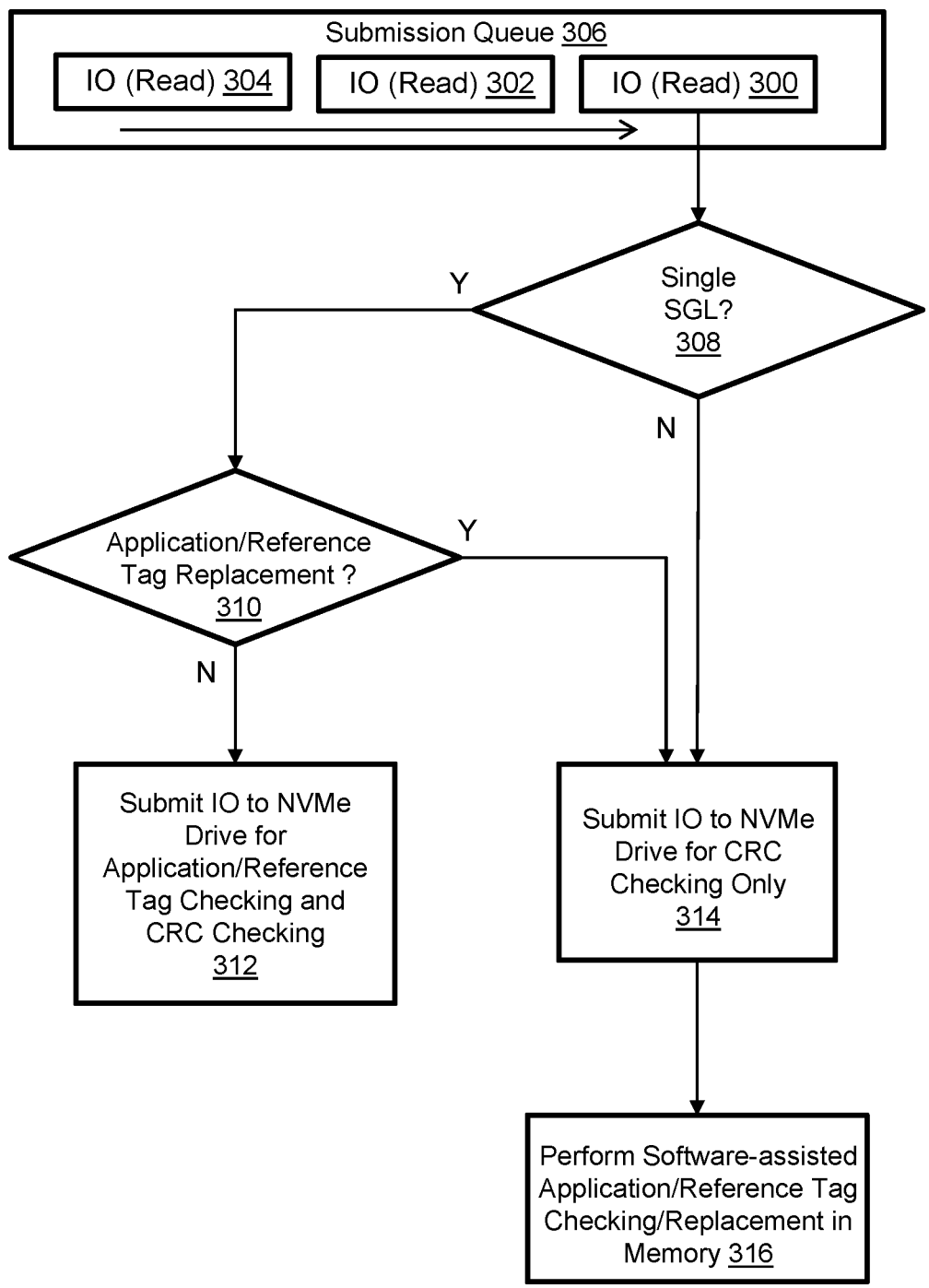
FIG. 3 is a flow diagram that illustrates software-assisted fine-grained data protection for read commands.

FIG. 3 is a flow diagram that illustrates software-assisted fine-grained data protection for read commands. Read IOs 300, 302, 304 in a submission queue 306 are each processed separately to determine on a per-IO basis whether to use the software-assist path. A selected IO 300 is examined to determine whether only a single SGL is specified as indicated at step 308. If it is determined at step 308 that only a single SGL is specified, then the IO 300 is examined to determine whether application tag or reference tag replacement is required as indicated at step 310. If not, then the IO is submitted to the NVMe managed drive for application tag and reference tag checking and CRC verification as indicated in step 312. In other words, for single-SGL read IOs that do not require T10-PI application tag or reference tag replacement, the application tag checking, reference tag checking, and CRC verification are performed by the NVMe managed drive during the data transfer. Read IOs that include multiple SGLs and/or require application tag or reference tag replacement are sent to the software-assist path. For example, if multiple SGLs are associated with the IO as determined in step 308 then the IO is submitted to the NVMe drive for CRC-only checking as indicated in step 314. If only a single SGL is associated with the IO as determined in step 308 but application tag or reference tag replacement is determined to be required at step 310, then the IO is submitted to the NVMe drive for CRC-only checking as indicated in step 314. In either situation software-assisted application tag and reference tag replacement and checking are then performed in the shared memory by the computing node as indicated in step 316. More particularly, in the software-assist path only the CRC checking is enabled for the NVMe managed drive, while the application tag and reference tag verification and replacement are done by software running on the computing node after the data transfer is completed from the managed drive.

Selective use of the software path and hardware path described above help to provide fine-grained T10-PI support while maintaining IO operation efficiency for single IO read/write commands transferring multiple data segments. NVMe hardware capability (i.e. the hardware path) is always utilized for CPU-intensive CRC verification. NVMe hardware capability is utilized for application tag and reference tag verification whenever possible. Software running on the computing node (i.e. the software path) is used for application tag and reference tag verification and replacement when those functions cannot be implemented by the NVMe hardware. Other approaches include breaking down an IO with multiple data segments into multiple IO operations, each with its own distinct T10-PI verification requirement done by the NVMe disk drive. However, that solution increases system load and could result in inferior performance in term of both lower maximum IOPS and increased average IO latency.

Specific examples have been presented in order to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
    in a storage array comprising a plurality of interconnected computing nodes, each of the computing nodes comprising at least one processor and a non-transitory memory, and a drive array comprising a plurality of non-volatile data storage drives on which extents of data are stored, each data storage drive connected to at least one of the computing nodes:
    with one of the computing nodes:
        selecting a first IO (input-output) command;
        determining that the first IO command is associated with only a single data segment in the memory;
        determining that the first IO command does not require replacement of an application tag; and
        determining that the first IO command does not require replacement of a reference tag; and
    with one of the drive arrays:
        performing CRC (cyclic redundancy check) verification of data associated with the first IO command;
        performing application tag verification of data associated with the first IO command; and
        performing reference tag verification of data associated with the first IO command.

2. The method of claim 1 comprising the computing node selecting a second IO command, determining that the second IO command is associated with multiple data segments, and in response performing application tag verification and reference tag verification of data associated with the second IO command with software running on the computing node.

3. The method of claim 2 comprising performing CRC (cyclic redundancy check) verification of data associated with the second IO command with the drive array.

4. The method of claim 1 comprising the computing node selecting a second IO command, determining that the second IO command requires replacement of an application tag, and in response replacing the application tag and performing application tag verification.

5. The method of claim 4 comprising performing CRC (cyclic redundancy check) verification of data associated with the second IO command with the drive array.

6. The method of claim 1 comprising the computing node selecting a second IO command, determining that the second IO command requires replacement of a reference tag, and in response replacing the reference tag and performing reference tag verification.

7. The method of claim 6 comprising performing CRC (cyclic redundancy check) verification of data associated with the second IO command with the drive array.

8. An apparatus comprising:
    a plurality of interconnected computing nodes, each of the computing nodes comprising at least one processor and a non-transitory memory;
    a drive array comprising a plurality of non-volatile data storage drives on which extents of data are stored, each data storage drive connected to at least one of the computing nodes; and
    software implemented by one of the computing nodes, comprising:
        instructions that select a first IO (input-output) command;
        instructions that determine that the first IO command is associated with only a single data segment in the memory;
        instructions that determine that the first IO command does not require replacement of an application tag; and
        instructions that determine that the first IO command does not require replacement of a reference tag;
    wherein one of the drive arrays performs CRC (cyclic redundancy check) verification of data associated with the first IO command, performs application tag verification of data associated with the first IO command, and performs reference tag verification of data associated with the first IO command.

9. The apparatus of claim 8 wherein the software implemented by the computing node selects a second IO command, determines that the second IO command is associated with multiple data segments, and in response performs application tag verification and reference tag verification of data associated with the second IO command.

10. The apparatus of claim 9 wherein the drive array performs CRC (cyclic redundancy check) verification of data associated with the second IO command.

11. The apparatus of claim 8 wherein the software implemented by the computing node selects a second IO command, determines that the second IO command requires replacement of an application tag, and in response replaces the application tag and performing application tag verification.

12. The apparatus of claim 11 wherein the drive array performs CRC (cyclic redundancy check) verification of data associated with the second IO command.

13. The apparatus of claim 8 wherein the software implemented by the computing node selects a second IO command, determines that the second IO command requires replacement of a reference tag, and in response replaces the reference tag and performing reference tag verification.

14. The apparatus of claim 13 wherein the drive array performs CRC (cyclic redundancy check) verification of data associated with the second IO command.

15. An apparatus comprising:
a storage system comprising a computing node connected with a drive array, and software that determines that a first IO (input-output) command is associated with only a single data segment in memory, determines that the first IO command does not require replacement of an application tag, determines that the first IO command does not require replacement of a reference tag, and prompts drive array hardware to perform CRC (cyclic redundancy check) verification of data associated with the first IO command and verify at least one of an application tag and a reference tag associated with the first IO command.

16. The apparatus of claim 15 wherein the software determines that a second IO command is associated with multiple data segments, and in response performs application tag verification and reference tag verification of data associated with the second IO command.

17. The apparatus of claim 16 wherein the drive array hardware performs CRC (cyclic redundancy check) verification of data associated with the second IO command.

18. The apparatus of claim 15 wherein the software determines that the second IO command requires replacement of at least one of the application tag and reference tag and, in response, replaces at least one of the application tag and the reference tag.

19. The apparatus of claim 18 wherein the software performs at least one of application tag verification and reference tag verification on the second IO command.

20. The apparatus of claim 19 wherein the drive array hardware performs CRC (cyclic redundancy check) verification of data associated with the second IO command.

* * * * *